United States Patent [19]

Weston

[11] 4,425,310
[45] Jan. 10, 1984

[54] PRODUCTION OF ALUMINUM CHLORIDES FROM BAUXITES AND CLAYS

[76] Inventor: David Weston, 34 Parkwood Ave., Toronto, Ontario, Canada M4V 2X1

[21] Appl. No.: 427,943

[22] Filed: Sep. 29, 1982

Related U.S. Application Data

[63] Continuation-in-part of Ser. No. 253,639, Apr. 13, 1981, abandoned, and a continuation-in-part of Ser. No. 377,992, May 13, 1982.

[51] Int. Cl.³ .......................... C01F 7/56; C01F 7/02
[52] U.S. Cl. .................................. 423/136; 423/133; 423/135; 423/76; 423/79; 423/149; 423/80; 423/343
[58] Field of Search .............. 423/133, 135, 136, 149, 423/415 A; 75/68 R, 68 A, 112, 113

[56] References Cited

U.S. PATENT DOCUMENTS

| | | | |
|---|---|---|---|
| 902,255 | 10/1908 | Saunders et al. | 423/135 |
| 1,147,832 | 7/1915 | Kugelgen et al. | 423/136 |
| 1,858,272 | 5/1932 | Jenness | 423/135 |
| 3,704,113 | 11/1972 | Hildreth | 75/112 |
| 3,793,003 | 2/1974 | Othmer | 423/136 |
| 3,816,093 | 6/1974 | Hildreth | 75/112 |
| 3,853,541 | 12/1974 | Othmer | 423/136 |
| 3,856,508 | 12/1974 | Othmer | 423/136 |
| 4,277,446 | 7/1981 | Weston | 423/135 |
| 4,288,414 | 9/1981 | Reynolds et al. | 423/135 |
| 4,355,007 | 10/1982 | Dunn | 423/135 |

FOREIGN PATENT DOCUMENTS

| | | | |
|---|---|---|---|
| 569830 | 2/1959 | Canada | 423/133 |
| 305578 | 9/1929 | United Kingdom | 423/136 |

Primary Examiner—Herbert T. Carter

[57] ABSTRACT

At least a two stage chlorination system for the production of aluminum trichloride and aluminum monochloride wherein in the gas stream containing the highest percentages of aluminum chloride produced $CO_2$ is present and the said gas stream is passed through a charcoal or devolatilized coke bed in a preferred temperature range of about 1000° C. to 1600° C. to convert the said $CO_2$ to CO and cycling at least part of the said CO produced to at least the second chlorination stage.

6 Claims, 3 Drawing Figures fig.1 — PREFERRED FLOWSHEET OF THE INVENTION and# PRODUCTION OF ALUMINUM CHLORIDES FROM BAUXITES AND CLAYS

BACKGROUND OF THE INVENTION

This invention is a continuation-in-part of U.S. Pat. application Ser. No. 253,639, filed Apr. 13, 1981, abandoned, and is a continuation-in-part of U.S. patent application Ser. No. 377,992, filed May 13, 1982.

The invention is primarily applicable to materials such as Bauxites and Clays that have present as major impurities iron and titanium in various mineral forms.

There has been a great deal of research and there is a vast quantity of literature in attempts to produce a relatively iron-free alumina, alumina-silica product and aluminum chloride from such raw materials as Bauxites and Clays. None of the processes proposed have been shown to be economically successful.

This problem can best be described by the following references: Landsberg "Chlorination Kinetics of Aluminum Bearing Minerals: Metallurgical Transactions B, Volume 6B, June 1975; pps. 207-208."

"Whereas Foley and Tittle showed that iron could be removed from pre-reduced bauxite by chlorination to produce a refractory grade alumina, FIG. 2 indicates that a substantial loss of alumina accompanies the initial rapid iron chlorination under reducing conditions. Even if this loss could be tolerated the remaining iron is too high for producing cell grade alumina or aluminum chloride."

U.S. Pat. No. 3,842,163, A. S. Russell et al, entitled "Production of Aluminum Chloride" and assignors to Aluminum Company of America, state, to quote lines 45 to 58:

"In general, the reduction of aluminum-containing materials with chlorine in the presence of reducing carbon in some form to produce aluminum chloride is an old and generally well-known reaction and one of the suggested expedients referred to above utilized Bauxite as the alumina containing material. Bauxite however, normally contains many impurities including iron oxide, silica, and titania. Since these impurities readily react with chlorine in the presence of carbon to form iron, silicon, and titanium chlorides, the usual gaseous aluminum chloride reaction effluent therefrom must be subjected to cumbersome and expensive after-purification measures if these chloride contaminants are to be separated to provide even a reasonably pure aluminum product."

The United States Department of the Interior, Information Circular 1412 by Robert L. de Beauchamp, sums up the problem of producing $AlCl_3$ from various materials on page 6, the last paragraph reading as follows:

"The raw materials that may be used for the preparation of $AlCl_3$, include bauxite, clays, shale, anorthosite, coal ash, and many other aluminum containing materials. Bauxite or clays are the most logical choices because of their higher $Al_2O_3$ contents and the large reserves of these materials available. Iron is the impurity most deleterious to the process since it uses up chlorine and is difficult to remove from the product."

Canadian Pat. No. 569,830 to Groth in 1939 described a method for chlorinating aluminiferous materials by treating dehydrated and crushed raw materials with aluminum chloride vapor at 600° C.–900° C., removing hot reaction gases containing iron chloride and titanium chloride, treating the residue with chlorine and a reducing agent, and processing the recovered aluminum chloride vapor containing silicon chloride and carbon monoxide at temperatures above 800° C. with alumina or aluminiferous materials free from iron and titanium. The gases recovered from the chlorination process are oxidized to convert at least the chlorides of iron and titanium to their oxides prior to condensation. Therefore, because of the oxidation step, chlorides of the materials are not recovered in reusable form. Further, the vapor mixture recovered cannot be diluted with CO in order that the oxidation stage can be carried out.

Groth Column 1, lines 28 to 32 states:

"It is true that when processing between 900° C.–1150° C. titanium is removed from the original material along with the iron in the form of titanium tetrachloride, but only in small amounts unless a large excess of aluminum chloride is used."

Weston, U.S. Pat. No. 4,277,446, in the first chlorination stage, depends upon the use of excess aluminum chloride containing $FeCl_3$ that is recovered from the circuit and returned to chlorinate the $Fe_2O_3$. To quote, Column 8, lines 30-34:

"(b) Excess $AlCl_3$ that is used is recovered at a low cost as an impure $AlCl_3$ containing $FeCl_3$ and returned to the Number One Chlorination Stage without any deleterious effects on chlorinating the contained iron and titanium minerals."

Most surprisingly I have found that with the present invention the removal of the $Fe_2O_3$ from the raw material is far more effective than from either the teachings of Groth or Weston.

SUMMARY OF THE INVENTION

It is accordingly a primary object of the present invention to provide a novel and low cost process for the production of a substantially pure aluminum chloride from Bauxites and Clays wherein the iron has previously been removed from the raw materials prior to mass chlorination of the contained aluminum bearing minerals to produce aluminum chloride.

A further object of the present invention is to provide a novel and low cost process for the production of aluminum-silicon products substantially free of iron.

In satisfaction of the foregoing objects and advantages there is presented by this invention in its broadest concept a process for the production of a substantially pure aluminum chloride, and substantially iron-free aluminia-silica product from various materials containing aluminum in the form of aluminum oxide minerals and complex aluminum minerals such as Kaolinite, that is $Al_2O_3.2SiO_2.2H_2O$, a preferred embodiment of the process comprising:

(a) Calcining the feed material prior to the first chlorination stage to remove free and chemically combined water, and where such minerals as Kaolinite are present to break the chemical bond of $Al_2O_3$, $SiO_2$, and $H_2O$, driving off the $H_2O$ as water vapor and forming amorphous $Al_2O_3$ and amorphous $SiO_2$, which products respond differentially to chlorination treatment.

(b) Number One Chlorination Stage in which the agents are at least CO and at least agent selected from the group consisting of $Cl_2$, $COCl_2$, $AlCl_3$, $AlCl$, $SiCl_4$ and $SiCl_2$. Most surprisingly, I have found that by the use of minor or starvation quantities of these groups of agents in a first chlorination stage at least 98% of the contained iron in the raw material can be differentially chlorinated. The temperature in this Number One Chlorination Stage is about 850° C. to about 1500° C. The end solids product from this Number One Chlorination Stage will be $Al_2O_3$ and $SiO_2$ substantially free of $Fe_2O_3$ and highly desirous by the refractories industry.

(c) This end solids product is further treated in a Number Two Chlorination Stage and in the temperature range of about 750° C. to 1150° C. to produce a substantially iron-free $AlCl_3$ by means well known to the Art using at least chlorination agents selected from the group consisting of $Cl_2$ and $COCl_2$, and reducing agents selected from the group consisting of C and CO. My preferred reducing agent is CO. The gas stream containing the $AlCl_3$ also has major quantities of $CO_2$ and by passing this gas stream either with the $AlCl_3$ present or following its removal through a charcoal or devolatilized coke bed in a preferred temperature range of about 1000° C. to 1150° C. the $CO_2$ is converted to CO and at least part of the gas stream containing the CO cycled to the chlorination stage producing the $AlCl_3$. The $AlCl_3$ is feed stock to the fused salt electrolytic cell for the production of aluminum metal. Where I wish to produce a substantially pure aluminum monochloride, that is AlCl, following the Number One Chlorination Stage the Number Two Chlorination Stage is carried out in the temperature range of about 1150° C. to 1500° C. and the ensuing gas stream containing AlCl and major quantities of $CO_2$ is passed through a charcoal or devolatilized coke bed in the temperature range of about 1200° C. to 1800° C. to convert substantially all of the $CO_2$ to CO, and at least part of the CO thus produced is cycled to the chlorination stage producing the AlCl following the reduction in temperature of the gas stream to below 1150° C. and preferably to within the temperature range of about 670° C. to 1050°.

If the contained iron in the feed material to the process is not removed prior to this Number Two Chlorination Stage normally a substantial portion of it will chlorinate under the Number Two Chlorination Stage conditions and finally report in the aluminum metal produced which is unacceptable in the production of a relatively pure aluminum metal. All of the steps described beginning with the Calcination Stage may be carried out in fluo-solids reactors well known in the Art.

The following will define for clarity various terms used in describing the invention:

Calcination—also knwon as dehydration—this terminology as used in this application means the following:
(a) Removal of any free moisture as steam.
(b) Breaking down of the bond of water of crystallization in aluminum oxide minerals which have the chemical analysis of $Al_2O_3xH_2O$, wherein a high percentage of water of crystallization is driven off as steam. In referring to alumina it may have the chemical formula of $Al_2O_3$ or $Al_2O_3 \cdot xH_2O$.

Breaking down of the chemical bond or bonds of complex aluminum minerals such as Kaolinite, $Al_2O_3 \cdot 2SiO_2 \cdot 2H_2O$, wherein the $H_2O$ is driven off as steam and the $Al_2O_3$ and $SiO_2$ are converted into amorphous $Al_2O_3$ and amorphous $SiO_2$ respectively. To accomplish satisfactory calcination of Bauxites and Clays, a temperature range of 625° C. to about 1500° C. may be used. It will be appreciated that the effectiveness of the calcination step is primary function of temperature and time, the economic optimum being readily determined by anyone skilled in the Art.

This stage of the process uses conventional equipment well known in the Art, and consists of such equipment as horizontal rotary kilns, vertical shaft furnaces, and fluo-solids reactors with their auxiliary gas scrubbers and dust collection units.

Clays—generally refer to materials containing little or no $Al_2O_3 \cdot xH_2O$ minerals and the major aluminum mineral component is essentially Kaolinite.

Iron and Titanium—the standard practice of the aluminum industry is to report Fe and Ti analyses as $Fe_2O_3$ and $TiO_2$. The iron and titanium minerals contained in the aluminum bearing materials vary considerably and are but rarely only in the form of $Fe_2O_3$ and $TiO_2$. For instance the major iron mineral in Arkansas Bauxite is siderite, $FeCO_3$, and the commonest occuring form of titanium is as ilmenite, $FeOTiO_2$. When I refer to percentages of $Fe_2O_3$ and $TiO_2$ herein, I mean the chemical analyses of Fe and Ti converted to $Fe_2O_3$ and $TiO_2$ respectively.

Aluminum chloride—Aluminum trichloride, i.e. $AlCl_3$ or $Al_2Cl_6$ and aluminum monochloride, i.e. AlCl.

Carbon—any form of carbon that can be used in specific stages of the process of the invention as a reducing agent for the contained metallic oxides in the raw material used in the process herein described, and that will not introduce added impurities that may have a major detrimental effect on the final desired product.

Examples of such carbon are charcoal, devolatilized coal coke, and devolatilized petroleum coke. The type of coke used should be carefully selected to avoid introducing comparatively large quantities of impurities that may have a major detrimental effect in the process to produce pure aluminum chloride.

Devolatilization—refers to solid fuels such as coal or petroleum coke or viscous fuels such as bitumen wherein the specific material has been heated to a sufficiently high temperature to drive off substantially all of the contained water as vapor and any free hydrogen contained in the raw material.

Neutral conditions—where there is just sufficient free oxygen to meet the needs of the reaction.

Oxidizing condition—where there is an excess of free oxygen to meet the needs of the reaction and free oxygen present at the end of the particular stage.

Reducing conditions—where there is an excess of free carbon CO, $H_2$, or CH radical present to meet the needs of the reaction.

BRIEF DESCRIPTION OF THE DRAWINGS

Reference is now made to the drawings accompanying the application where it will be seen that FIG. 1 shows a preferred flowsheet of the invention for the production of an alumina-silica product substantially free of iron and the further treatment of this product to produce aluminum trichloride or aluminum monochloride substantially free of ferric chloride and as feed stock for the production of substantially pure aluminum metal.

The gas stream containing the CO, and after removal of the aluminum chloride, (not shown) is preferably cycled to the numbers one and two chlorination stages.

Figure 3:
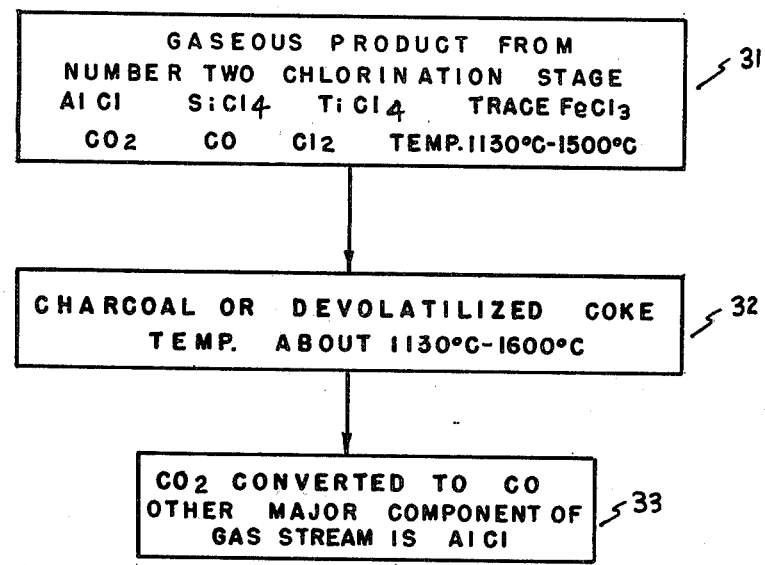

FIG. 3 shows a preferred flowsheet of the invention wherein the Number Two Chlorination Stage has been carried out in the temperature range of about 1150° C.–1500° C. to produce aluminum monochloride and wherein the $CO_2$ in the gas stream is converted to CO.

DETAILED DESCRIPTION OF THE DRAWINGS

Figure 1:
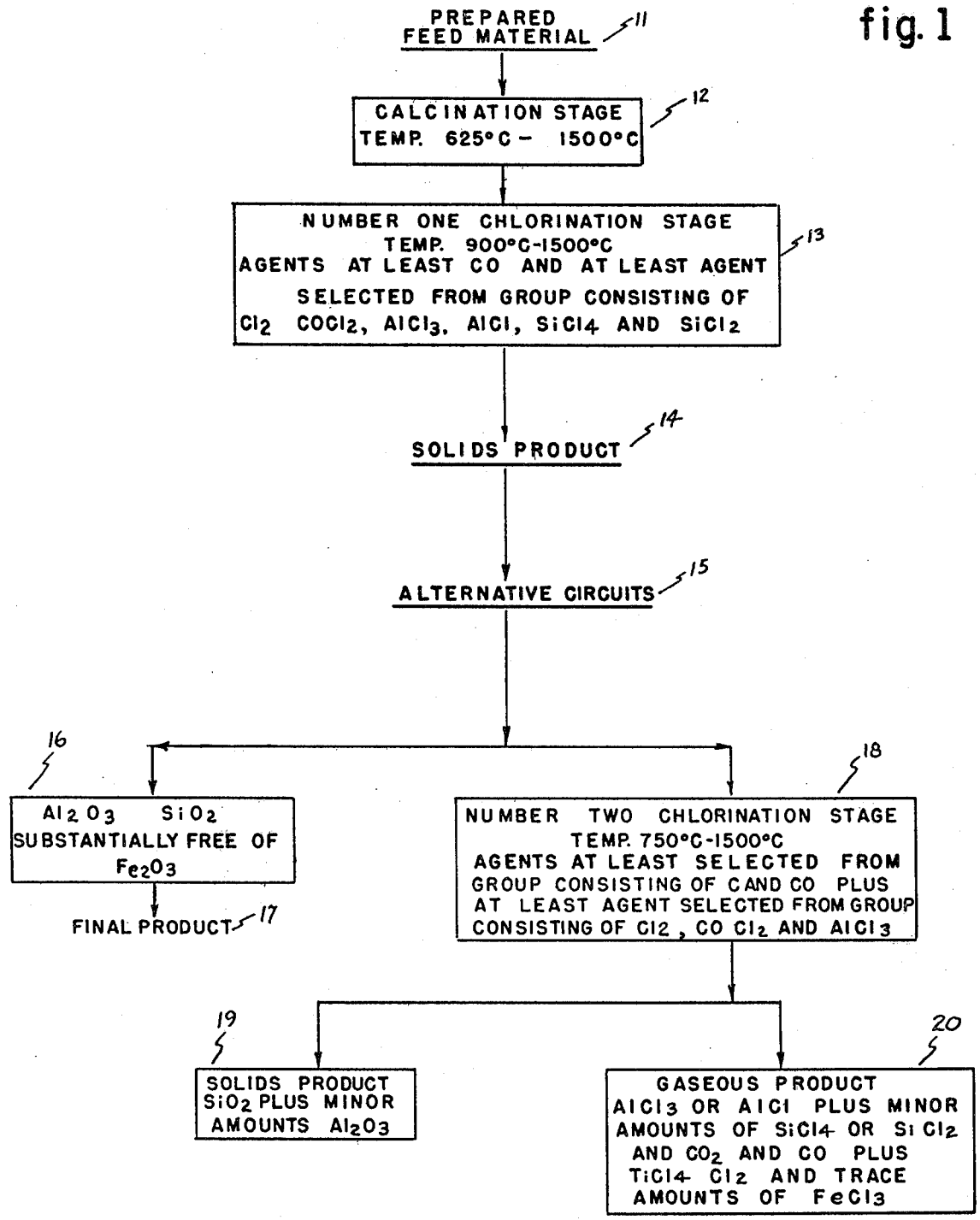

FIG. 1 shows a preferred flowsheet of the invention. The prepared feed material shown at 11 may have been pretreated by magnetic cobbing to remove part of the $Fe_2O_3$ and where present ilmenite and biotite mica. Where ultra fines are present the feed material may have been granulated or pelletized by conventional means to prevent losses in the gas streams during calcination or chlorination particularly when using fluo-solids reactors.

The feed material is fed to the Calcining Stage 12 to remove free moisture and water of crystallization. The equipment is conventional (not shown) consisting of such units as horizontal kilns, shaft furnaces, and fluo-solids reactors. In the calcination Stage 12 and in the at least two chlorination stages shown as 13 and 18 my preferred equipment (not shown) is fluo-solids reactors. From the Calcination Stage the material is fed to the Number One Chlorination Stage shown at 13. In this stage as much as 98% of the $Fe_2O_3$ in the material is differentially chlorinated with but minor to negligible amounts of the contained $Al_2O_3$. The solids product from the Number One Chlorination Stage is fed to the Number Two Chlorination Stage shown at 18 wherein the solids product shown at 16, normally analyzes less than 0.03% $Fe_2O_3$, which is an unheard of purity for use in the refractory industry where the limiting $Fe_2O_3$ specification is of utmost importance.

Where it is desirous to produce an aluminum chloride product substantially free of iron the solids product 14 is fed to the Number Two Chlorination Stage shown at 18. This stage involves mass chlorination of the contained alumina normally using large concentrations of $Cl_2$ either as $Cl_2$ or $COCl_2$ and alternately in the temperature range of about 1150° C. to 1500° C., $AlCl_3$, which breaks down to form AlCl and $Cl_2$ and is used either alone or in combination with $Cl_2$ or $COCl_2$ or both $Cl_2$ and $COCl_2$ as the chlorinating agent.

The solids product shown at 19 produced from Kaolinite, consists of amorphous silica and minor amounts of alumina and is either a waste product or may be marketed as, primarily, filler.

The gaseous product shown at 20 will contain the desired aluminum chloride plus minor amounts of $SiCl_4$, $TiCl_4$, $Cl_2$, $CO_2$ and CO, and trace amounts of $FeCl_3$. The $FeCl_3$ has a vapor solubility in the $AlCl_3$ and thus it is of the utmost importance to reduce the $Fe_2O_3$ in the feed material to the Number Two Chlorination Stage to the lowest possible level which in the invention has been demonstrated to be less than 0.02% or in excess of 98% of the original $Fe_2O_3$ contained in the feed material.

Figure 2:
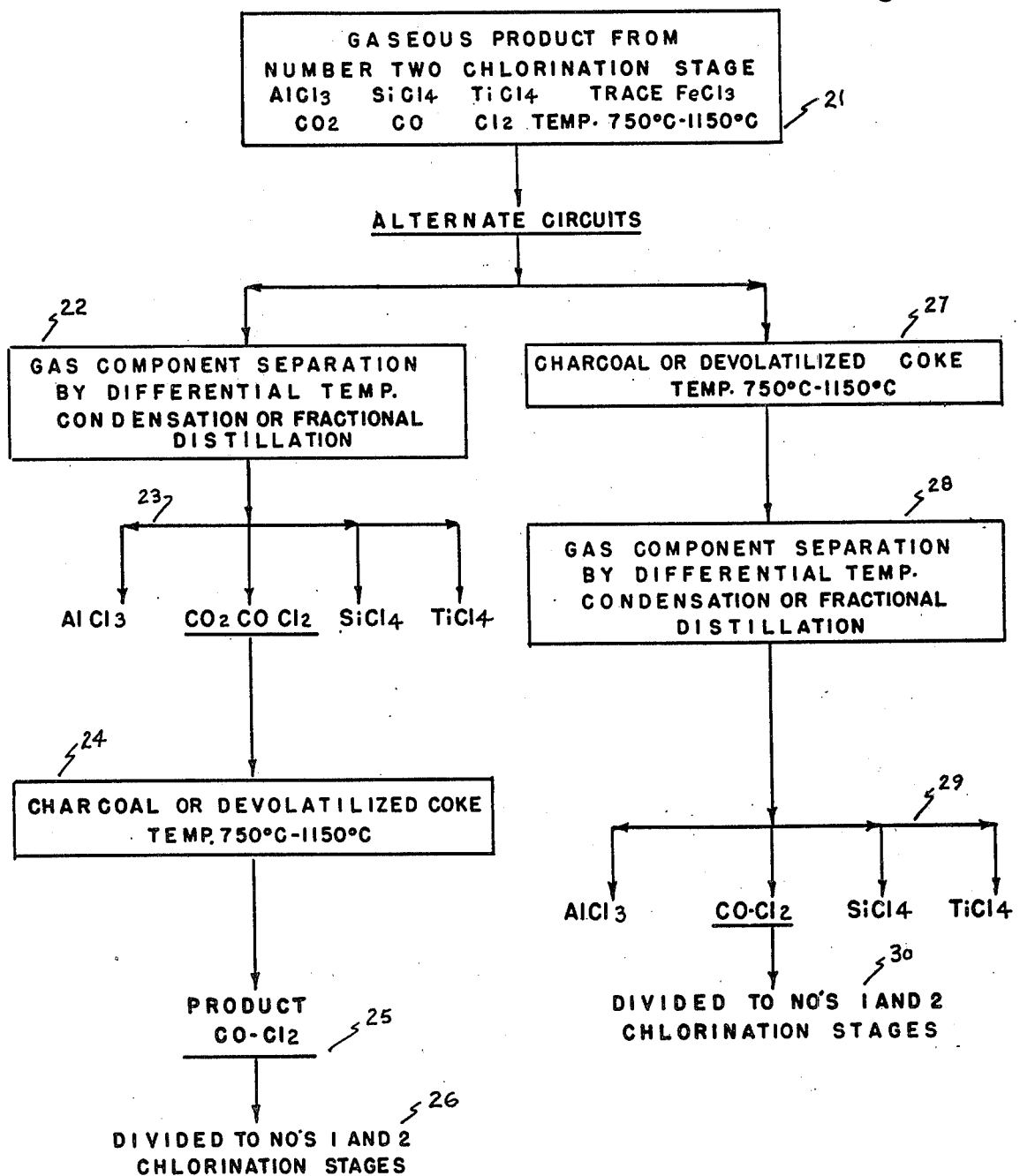
FIG. 2 shows a preferred flowsheet of the invention treating the gaseous product produced by Number Two Chlorination Stage for the production of aluminum trichloride by passing the gaseous product through a charcoal or devolatilized coke bed to convert the contained $CO_2$ to CO.

FIG. 2 shows a preferred flowsheet of the invention treating the gaseous product from Number Two Chlorination Stage. The gaseous product shown at 21 is passed through one or more beds of charcoal or devolatilized coke shown at 27 to convert $CO_2$ contained in the gas stream to CO. The gas stream discharging from the treatment stage is either treated by differential temperature condensation or fractional distillation or a combination of the two as shown at 29, and well known to the Art, to produce as shown at 29 substantially pure $AlCl_3$ which is a saleable product in itself or may be fed to a fused salt electrolytic bath to produce aluminum metal and the contained chlorine released and returned to the Number Two Chlorination Stage. In addition the $SiCl_4$ may be sold as a commercial product with at least part cycled to the Numbers One or Two or both Chlorination Stages. The $TiCl_4$ can be converted to either titania or titanium metal. The CO and $Cl_2$ remaining in the gas stream are preferably cycled to Numbers One and Two Chlorination Stages.

An alternate circuit shown at 22 to 26 separatess the $AlCl_3$, $SiCl_4$ and $TiCl_4$ from the $CO_2$, CO, and $Cl_2$ prior to conversion of the $CO_2$ to CO. In a preferred embodiment (not shown) the $SiCl_4$ is retained in the gas stream with the CO and $Cl_2$ thus supplying the requisite $SiCl_4$ to the Number One Chlorination Stage.

FIG. 3 shows a preferred flowsheet of the invention treating the gaseous product from Number Two Chlorination Stage in the temperature range of about 1150° C. to 1600° C. The gaseous product shown at 31 is passed through a devolatilized coke or charcoal bed, or combination of the two shown at 32 to convert the contained $CO_2$ to CO shown at 33.

In a subsequent treatment stage (not shown) if any $CO_2$ is present in the condensation stage to produce aluminum metal the $CO_2$ oxidizes the aluminum metal to form CO and aluminum oxide. Thus this conversion step of the $CO_2$ to CO is most important.

EXAMPLES OF THE NUMBER ONE CHLORINATION STAGE OF THE INVENTION USING CO AS THE MAJOR PART OF THE GAS STREAM

The following examples of the invention were carried out on a bulk sample of Kaolinitic Clay from a deposit located in the south eastern United States of America.

The sample as received was magnetically cobbed in a Colborne laboratory high intensity magnetic laboratory unit, dried to approximately 5% free moisture, crushed, put through a rolls and screened at 8 to 18 mesh and 65 or 100 mesh to produce a product that was essentially minus 8 plus 100 U.S. Standard. This product was calcined at 700° C. to 750° C., and after calcination was the feed material to the following examples unless otherwise noted.

The chemical analysis of the calcined product was as follows:

| $Al_2O_3$ | $SiO_2$ | $Fe_2O_3$ | $TiO_2$ | L.O.I. |
| --- | --- | --- | --- | --- |
| 44.0 | 51.5 | 1.27 | 2.77 | 0.3 |

All of the examples were carried out in a 2½ inch fluo-solids reactor using batch charges of 250 grams.

The total gas volume used in all tests was kept reasonably constant at 5.0 liters per minute calculated at 21.1° C., and adjusted to the 5.0 liters with CO.

EXAMPLE 1

The following were conditions of this example:

Temperature in Number One Chlorination Stage, 975° C.

Agents used: 1.06 gms/min. Cl and make-up of gas stream to approximately 5.0 liters/min. with CO.

Treatment time: 20 mins.

At the end of the 20 minute treatment of the solids feed the residual solids product analyzed 0.022% $Fe_2O_3$. This analysis shows that 98.3% of the $Fe_2O_3$ in the feed material was chlorinated to produce a substantially iron-free alumina silica product.

The $Cl_2$ formed approximately 7% of the total gas stream and was about the maximum that could be tolerated in the preferred use of the invention without undue chlorination of the contained alumina.

This was an outstanding result from the use of starvation quantities of $Cl_2$ and the short duration of the differential chlorination treatment. The alumina-silica product is outstanding in the low iron content for refractories and alternately in the production of aluminum chloride using the previously described number two mass chlorination stage would produce a substantially iron-free aluminum chloride product suitable for the production of aluminum metal, particularly for the automotive industry aluminum-silicon alloys and can stock.

EXAMPLE 2

The following were conditions of this example:

Temperature in Number One Chlorination Stage, 1010° C.

Agents used: 0.7 gms/min. $SiCl_4$ and make-up of gas stream to approximately 5.0 liters/min. with CO.

At the end of the 20 minute treatment of the solids feed the residual solids analyzed 0.021% $Fe_2O_3$. This analysis shows that 98.3% of the $Fe_2O_3$ in the feed material was chlorinated to produce a substantially iron-free alumina-silica product.

The $SiCl_4$ formed approximately 1.9% of the total gas stream and the maximum required for optimum results under varied conditions of usage in the preferred embodiments of the invention is about 5%.

EXAMPLE 3

The following were conditions for this example:

Temperature in Number One Chlorination Stage, 950° C.

Agent used: 3.94 gms. $AlCl_3$ and make-up of gas stream to approximately 5.0 liters/min. with CO.

Treatment time: 90 mins.

Feed Size: Minus 10 mesh plus 100.

The $AlCl_3$ formed approximately 14% of the total gas stream. In the preferred use of the invention the $AlCl_3$ or AlCl concentration does not exceed about 20% of the total gas stream. At the end of the 90 minute treatment of the solids feed the residual solids product analyzed 0.019% $Fe_2O_3$. This analysis shows that 98.5% of the $Fe_2O_3$ in the feed material was chlorinated to produce a substantially iron-free alumina-silica product with no chlorination of the alumina contained in the feed material.

It will be noted that in the preferred embodiments of the invention wherein in the first chlorination stage the chlorination agent selected from the group consisting of $Cl_2$, $COCl_2$, $AlCl_3$, AlCl, $SiCl_4$, and $SiCl_2$ does not exceed about 20% by volume of the total gas stream and wherein the said chlorination stage is carried out in the presence of CO and in the temperature range of about 850° C. to 1500° C.

The highly effective differential chlorination of the iron as shown in the examples using starvation to minor amounts of chlorination agent and major amounts of CO is not understood. In using $AlCl_3$ and $SiCl_4$ as chlorination agents larger concentrations than shown in the examples gave appreciably poorer results. This is counter to either chemical theory or knowledge in the Art. For instance in the mass chlorination of alumina using $Cl_2$ researchers have shown that the percent of alumina conversion to aluminum chloride increased as the percent of $Cl_2$ in the gas stream was increased up to about 50%.

It can be postulated that in using starvation to minor amounts of the above noted chlorination agents and major amounts of CO monomolecular layers of chlorides are formed on the iron particles as they are chlorinated allowing the chlorination gases to penetrate this layer and thus continue the reaction, while with higher concentrations of the chlorination agents multimolecular layers form that prevent penetration by the chlorination gases.

There is no ready explanation for this most surprising phenomenon; the above possible explanation can only be taken as a postulation.

It will be obvious that in applying the invention to such materials as Bayer process alumina, which product is substantially iron-free, only the mass chlorination stage of the invention would be used, or as commonly referred to herein, the Number Two Chlorination Stage.

The invention has been described herein with reference to certain preferred embodiments. However, as obvious variations thereon will become apparent to those skilled in the Art, the invention is not considered limited thereto.

What I claim as my invention is:

1. The process steps for the production of substantially iron free aluminum monochloride from the group of prepared materials consisting of kaolinitic clays and bauxites and said materials containing aluminous and siliceous minerals and iron as iron mineral comprising:

(a) subjecting the said prepared materials to a calcining stage wherein the said materials are heated to within the temperature range of about 625° C. to 1500° C. to remove free moisture and water of crystallization combined in said minerals contained in the said materials and to convert said aluminous and siliceous minerals to alumina and silica thus producing a solids alumina-silica iron containing calcined solids product;

(b) subsequently subjecting the said calcined solids product to at least one chlorination stage wherein the said chlorination stage is carried out employing a gas stream containing at least CO and in the presence of at least one chlorination agent selected from the group consisting of $Cl_2$, $COCl_2$, $AlCl_3$, AlCl, $SiCl_4$ and $SiCl_2$ and wherein the said chlorination agent does not exceed 20% by volume of the said gas stream and wherein the said chlorination stage is carried out in the temperature range of about 850° C. to 1500° C. to produce a chlorinated said solids alumina-silica product substantially free of said iron;

(c) subsequently subjecting the said substantially iron-free alumina-silica product to a further chlorination stage wherein the said chlorination agent is at least one member selected from the group consisting of $Cl_2$, $COCl_2$ and $AlCl_3$ and in the presence of reducing agent selected from the group consisting of C and CO in the temperature range of about 1150° C. to 1500° C. to chlorinate the said alumina to produce a gaseous product containing at least aluminum monochloride and $CO_2$ and substantially free of said iron; and (d) subsequently passing the said gaseous product through a bed selected from the group consisting of devolatilized coke and charcoal in the temperature range of about 1200° C. to about 1600° C. to convert the said $CO_2$ to CO to produce a gas stream containing at least the said aluminum monochloride and said CO substantially free of said iron.

2. The process steps for the production of substantially iron free aluminum trichloride from the group of prepared materials consisting of kaolinitic clays and bauxites and said materials containing aluminous and siliceous minerals and iron as iron mineral comprising:

(a) subjecting the said prepared materials to a calcining stage wherein the said materials are heated to within the temperature range of about 625° C. to 1500° C. to remove free moisture and water of crystallization combined in said minerals contained in the said materials and to convert said aluminous and siliceous minerals to alumina and silica thus producing a solids alumina-silica iron containing calcined solids product;

(b) subsequently subjecting the said calcined solids product to at least one chlorination stage wherein the said chlorination stage is carried out employing a gas stream containing at least CO and in the presence of at least one chlorination agent selected from the group consisting of $Cl_2$, $COCl_2$, $AlCl_3$, $AlCl$, $SiCl_4$ and $SiCl_2$ and wherein the said chlorination agent does not exceed 20% by volume of the said gas stream and wherein the said chlorination stage is carried out in the temperature range of about 850° C. to 1500° C. to produce a chlorinated said solids alumina-silica product substantially free of said iron;

(c) subsequently subjecting the said substantially iron-free alumina-silica product to a further chlorination stage wherein the said chlorination agent is at least one member selected from the group consisting of $Cl_2$ and $COCl_2$ and in the presence of reducing agent selected from the group consisting of C and CO and in the temperature range of about 750° C. to about 1150° C. to chlorinate the said alumina to produce a gaseous product containing at least aluminum trichloride and $CO_2$ and substantially free of said iron;

(d) subsequently passing the said gaseous product through a bed selected from the group consisting of devolatilized coke and charcoal in the temperature range of about 1000° C. to about 1150° C. to convert the said $CO_2$ to CO to produce a gas stream containing at least the said aluminum trichloride and said CO substantially free of said iron;

(e) subsequently lowering the temperature of the said gas stream to condense the said aluminum trichloride substantially free of said iron and to produce a gas stream containing the said CO and impoverished in said aluminum trichloride; and (f) subsequently cycling at least part of the said gas stream containing the said CO to the at least one chlorination stage.

3. The process of claim 2 wherein at least part of the said gas stream containing the said CO is cycled to the said further chlorination stage.

4. The process steps for the production of aluminum monochloride from Bayer process alumina comprising:

(a) subjecting the said alumina to a calcining stage within the temperature range of about 625° C. to about 1500° C. to remove free moisture and water of crystallization combined in said alumina to produce a calcined alumina product;

(b) subsequently subjecting the said calcined product to chlorination wherein the chlorination agent is at least one member selected from the group consisting of $Cl_2$, $COCl_2$ and $AlCl_3$ and in the presence of reducing agent selected from the group consisting of C and CO and in the temperature range of about 1150° C. to 1500° C. to chlorinate the said alumina to produce a gaseous product containing at least aluminum monochloride and $CO_2$; and (c) subsequently passing the said gaseous product through a bed selected from the group consisting of devolatilized coke and charcoal in the temperature range of about 1200° C. to 1600° C. to convert the said $CO_2$ to CO to produce a gas stream containing the said aluminum monochloride and the said CO.

5. The process steps for the production of aluminum trichloride from Bayer process alumina comprising:

(a) subjecting the said alumina to a calcining stage within the temperature range of about 625° C. to about 1500° C. to remove free moisture and water of crystallization combined in said alumina to produce a calcined alumina product;

(b) subsequently subjecting the said calcined product to chlorination wherein the chlorination agent is at least one member selected from the group consisting of $Cl_2$ and $COCl_2$ and in the presence of reducing agent selected from the group consisting of C and CO and in the temperature range of about 750° C. to about 1150° C. to chlorinate the said alumina to produce a gaseous product containing at least aluminum trichloride and $CO_2$;

(c) subsequently passing the said gaseous product through a bed selected from the group consisting of devolatilized coke and charcoal in the temperature range of about 1000° C. to about 1150° C. to convert the said $CO_2$ to CO to produce a gas stream containing the said aluminum trichloride and said CO;

(d) subsequently lowering the temperature of the said gas stream to condense the said aluminum trichloride and to produce a gas stream containing the said CO and impoverished in said aluminum trichloride; and (e) subsequently cycling at least part of the said gas stream containing the said CO to the said chlorination.

6. The process of claim 2 or 5 wherein the said gas stream containing the said aluminum trichloride and $CO_2$ is passed through the said charcoal or devolatilized coke bed subsequent to the removal of the said aluminum trichloride from the said gas stream to produce a gas stream containing CO and denuded of said aluminum trichloride.

* * * * *